(No Model.)
J. A. BILZ.
PLOW.
No. 351,154. Patented Oct. 19, 1886.
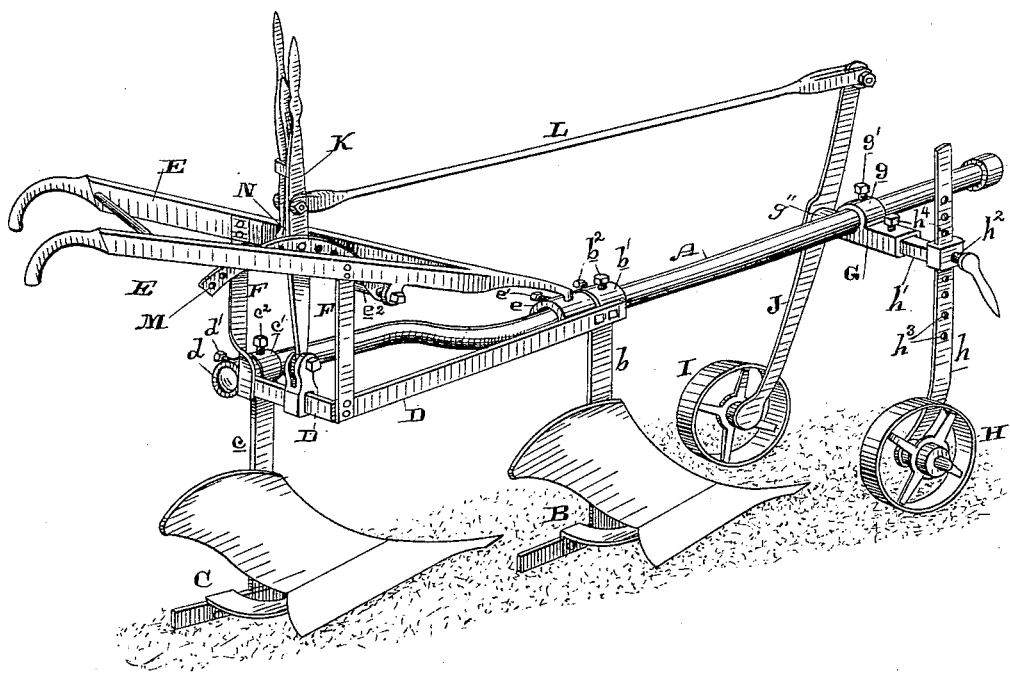
Witnesses,
Geo. H. Strong.
Inventor,
John A. Bilz
By Dewey & Co.
Att'ys

United States Patent Office.

JOHN A. BILZ, OF PLEASANTON, CALIFORNIA.

PLOW.

SPECIFICATION forming part of Letters Patent No. 351,154, dated October 19, 1886.

Application filed June 28, 1886. Serial No. 206,504. (No model.)

*To all whom it may concern:*

Be it known that I, JOHN A. BILZ, of Pleasanton, in the county of Alameda and State of California, have invented an Improvement in Plows; and I hereby declare the following to be a full, clear, and exact description thereof.

My invention relates to the class of plows, and particularly to that class in which two plow-bottoms are used, and generally known as "gang-plows."

My invention consists in the construction and combination of devices, all of which I shall hereinafter fully describe.

The object of my invention is to provide a simple and effective gang-plow, which is specially adapted for use in orchards and vineyards, where the plowing must be done close to the trees and yet not injure them.

Referring to the accompanying drawing, the figure is a perspective view of my plow.

A is the plow-beam. It consists of a piece or bar of steel, its rear end being bent out of line with its forward end and to one side thereof.

B is the forward plow-bottom, which is secured to the beam by its standard $b$, the top of which has an eye or socket, $b'$, through which the beam passes, said eye being set by two screws, $b^2$, one in the top and one in the side. The plow-bottom B is secured to the beam at a point just in front of the bend in said beam.

C is the rear plow-bottom, which is secured to the rear end of the beam by means of its standard $c$, which has an eye or socket, $c'$, fitting over the beam, and set by screws $c^2$, in a manner similar to the way in which the forward plow-bottom is secured. The rear plow, being on the bent rear end of the beam, is out of line with the forward plow.

D is a bent brace or bar, the forward end of which is bolted to the standard of the forward plow, and its rear end is provided with an eye or socket, $d$, which fits over the rear end of the beam, just behind the eye or socket of standard $c$, and is set by screws $d'$.

E are the main handles, which, for the use to which the plow is to be put, are made narrower than the ordinary handles. Their forward ends are provided with an eye or socket, $e$, through which the beam passes, and is set by a screw, $e'$. The handles are supported by bars F, which rise from the bent brace-bar D.

Upon the forward end of the beam is a cross-bar, G, which is secured to the beam by an eye or socket, $g$, and screw $g'$. One end of the bar G is socketed or chambered out, while its other end is provided with a small journal, $g''$.

H is a guide-wheel, having a standard, $h$, upon which is fitted a short arm, $h'$, which can be adjusted vertically thereon by means of the set-screw $h^2$, which passes into any of the series of holes $h^3$ in the standard. The arm $h'$ fits in the socketed end of the bar G, and may be moved in or out, and fixed where adjusted by a screw, $h^4$, whereby the wheel H may be adjusted to run in the furrow or upon the land, or may be removed altogether. By setting the wheel close in, the plow may be run close to the trees or vines.

I is a wheel by which the plow is adjusted to run deep or shallow. It is journaled in the lower end of a lever, J, which is pivoted upon the journal end of the bar G.

K is a lever which passes down between the handles, and is pivoted at its lower end to the bent brace-bar D. This lever is connected with the upper end of lever J by a rod, L. Between the main handles is a cross-bar, $e^2$, to which is pivoted a perforated arc, M, with which a spring-pawl, N, pivoted to lever K, is adapted to engage, whereby the said lever is held in the position to which it is adjusted, and the position of the plow is permanently fixed.

It will be seen from this construction that the whole plow is very light and yet durable. It is well adapted for the purposes for which it is intended, as it can be run as close to the trees or vines as is needed. The bend in the beam enables me to place two plows upon a single beam, and by coupling the whiffletree to one side (which is done by means of the usual adjustable clevis) I can still obtain a center draft, no matter how close the plow may be running to the trees or vines.

Having thus described my invention, what I claim as new, and desire to secure by Letters Patent, is—

1. The plow-beam having a cross-bar, G, secured to its forward end, in combination with a standard at one side of the beam, an arm engaging the cross-bar and standard and adjusted vertically and laterally, and a guide-wheel carried by said standard, substantially as herein described.

2. In combination with a plow-beam, the bar G upon the forward end of the beam, said bar having a socketed end, the guide-wheel H, having a standard, $h$, and the arm $h'$, vertically adjustable upon the standard and fitting the socketed end of the bar and adjustable therein, substantially as described.

3. In a plow, the beam A and the plow-bottoms B C, secured to said beam, as described, in combination with the cross-bar G on the forward end of the beam and having a socketed end, the guide-wheel H, having standard $h$, the arm $h'$, fitted upon said standard and in the socketed end of bar G, and set-screws by which the adjustments of the arm on the standard and in the bar are fixed, substantially as herein described.

4. In a plow, the beam A, the plow-bottoms B C, secured thereto, and the cross-bar G, secured to the forward end of the beam and having a journal, $g''$, in combination with the lever J, mounted on said journal, the wheel I on the lower end of the lever, and means, substantially as described, for operating said lever to regulate the depth of the plows, as herein set forth.

5. In a plow, the laterally-bent arm A and the plow-bottoms B C, secured to the beam, as described, in combination with the wheels H and I at the forward end of the beam, a pivoted lever, J, upon which the wheel I is mounted, the cross-bar G at the front of the beam, the lever K, and the rod L, connecting said lever with the lever J, substantially as herein described.

6. In a plow, the laterally-bent beam A and the plow-bottoms B C, secured thereto, as described, in combination with the bar G, the vertically and laterally adjustable guide-wheel H on one side of the forward end of the beam, and the adjusting-wheel I on the other side of the beam for regulating the depth of the plows, substantially as described.

7. A plow comprising the laterally-bent arm A, the plows B C, the bent brace-bar D, the cross-bar G on the forward end of the beam, having a socketed end, the guide-wheel H, having standard $h$, and arm $h'$, vertically adjustable on the standard and adjustable in the socketed end of the cross-bar, the wheel I, having lever J pivoted upon the other end of the cross-bar, the lever K, and the connecting-rod L, all constructed and arranged to operate substantially as herein described.

In witness whereof I have hereunto set my hand.

JOHN A. BILZ.

Witnesses:
C. D. COLE,
J. H. BLOOD.